US009440253B2

United States Patent
Kerrom et al.

(10) Patent No.: US 9,440,253 B2
(45) Date of Patent: Sep. 13, 2016

(54) PROCESS FOR FABRICATING AN ELECTROMAGNETIC FLOW METER

(75) Inventors: Roger Kerrom, Lorrach (DE); Beat Tschudin, Reinach (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 273 days.

(21) Appl. No.: 13/703,830

(22) PCT Filed: May 11, 2011

(86) PCT No.: PCT/EP2011/057592
§ 371 (c)(1),
(2), (4) Date: Dec. 12, 2012

(87) PCT Pub. No.: WO2011/157491
PCT Pub. Date: Dec. 22, 2011

(65) Prior Publication Data
US 2013/0086993 A1    Apr. 11, 2013

(30) Foreign Application Priority Data

Jun. 17, 2010 (DE) .......... 10 2010 030 229

(51) Int. Cl.
*H01R 43/00*       (2006.01)
*B05D 1/00*        (2006.01)
*G01F 1/58*        (2006.01)

(52) U.S. Cl.
CPC ................. *B05D 1/00* (2013.01); *G01F 1/584* (2013.01); *Y10T 29/4922* (2015.01)

(58) Field of Classification Search
CPC .................. Y10T 29/4922; Y10T 29/49208; Y10T 29/49204; Y10T 29/49117; Y10T 29/49002; Y10T 29/49; B05D 1/00; G01F 1/584
USPC .............. 29/883, 876, 874, 825, 592.1, 592; 73/861.12, 861.13, 861.11, 861.08, 73/861, 861.02
See application file for complete search history.

(56) References Cited

U.S. PATENT DOCUMENTS 4,774,844 A    10/1988  Davis
5,847,287 A    12/1998  Davis
(Continued)

FOREIGN PATENT DOCUMENTS

DE    1098727    2/1961
DE    3004870    8/1981
(Continued)

OTHER PUBLICATIONS

German Search Report, Jun. 17, 2010, Munich.
(Continued)

*Primary Examiner* — Peter DungBa Vo
*Assistant Examiner* — Azm Parvez
(74) *Attorney, Agent, or Firm* — Bacon & Thomas, PLLC

(57) ABSTRACT

A process for fabricating an electromagnetic flow meter by encapsulating an electrode with a liquefied plastic. The electrode is fabricated out of an electrically conducting material and with at least a first circumferential indentation that runs orthogonal to the longitudinal expansion of the electrode. The electrode is positioned in a tool and encapsulated with a liquefied plastic, at least in sections, wherein the first indentation is encapsulated, at least in sections, with liquefied plastic. Also, an electromagnetic flow meter for measuring the volumetric flow or mass flow of a medium in a pipe, with a measurement tube, through which the medium flows in the direction of the longitudinal axis, and with a magnetic system that is so embodied as to produce a magnetic field that passes through the measurement tube and runs essentially orthogonal to the longitudinal axis of the measurement tube, and with at least one measurement electrode that couples to the medium, which is arranged essentially orthogonal to the region of the magnetic field in a bore hole in the wall of the measurement tube.

12 Claims, 3 Drawing Sheets

(56) References Cited

U.S. PATENT DOCUMENTS

| | | | | |
|---|---|---|---|---|
| 7,055,396 B1* | 6/2006 | Thai | ................ | G01F 1/588 73/861.12 |
| 2009/0104521 A1* | 4/2009 | Yasuda | ............... | H01M 2/0417 429/174 |
| 2011/0113895 A1* | 5/2011 | Kerrom | ................... | G01F 1/584 73/861.12 |

FOREIGN PATENT DOCUMENTS

| DE | 19535998 | 4/1997 |
|---|---|---|
| DE | 102005030193 | 1/2007 |
| DE | 102007004826 | 8/2008 |
| JP | 59-168323 | 11/1984 |
| JP | 05099715 | 4/1993 |
| WO | W O 2008/059020 | 5/2008 |
| WO | W O 2010/015534 | 2/2010 |

OTHER PUBLICATIONS

International Search Report, Oct. 10, 2011, The Netherlands.

* cited by examiner

PROCESS FOR FABRICATING AN ELECTROMAGNETIC FLOW METER

TECHNICAL FIELD

The present invention relates to a process for fabricating an electromagnetic flow meter by encapsulating an elongated electrode with a liquefied plastic, and an electromagnetic flow meter that is fabricated according to the inventive process.

BACKGROUND DISCUSSION

Electromagnetic flow meters use the principle of induction in electrodynamics for volumetric flow measurements and are known from a multitude of publications and/or disclosures. Charge carriers of the medium, which move orthogonally to an applied magnetic field, induce a measurement voltage in measurement electrodes that are positioned essentially orthogonal to the direction of the flow of the medium and orthogonal to the direction of the magnetic field. The measurement voltage induced in the measurement electrodes is proportional to the average flow velocity of the medium through a cross section of the measurement tube, i.e. proportional to the volumetric flow. If the density of the medium is known, the mass flow in a pipe and measurement tube, respectively, can be determined. The measurement voltage is usually picked up via a pair of measurement electrodes, which are positioned, in reference to the coordinates along the measurement tube axis, in the region of the maximum magnetic field strength and where, it follows, the maximum measurement voltage is to be expected. Usually, the electrodes are in electrical contact with the medium; however, electromagnetic flow meters having contactless capacitively coupled electrodes are also known.

The measurement tube can thereby be manufactured from either nonmagnetic electrically conducting material, e.g. stainless steel, or consist of an electrically isolating material. If the measurement tube is manufactured from an electrically conducting material, then in the region where it is in contact with the medium it is lined with an electrically isolating material. The liner, depending on temperature and medium, consists, by way of example, of a thermoplastic, duroplastic or a plastic elastomer. There are, however, electromagnetic flow meters known with a ceramic liner.

An electrode can be essentially divided into an electrode head, which at least partially comes into contact with the medium that flows through the measurement tube, and an electrode shaft, which is almost wholly inserted into the wall of the measurement tube.

Along with the magnetic system, the electrodes are the central components of an electromagnetic flow meter. In the embodiment and arrangement of the electrodes, one should pay attention that they are mounted on the measurement tube as simply as possible and that subsequently during measurement operation, no leakage problems arise; even further, the electrodes should feature a sensitive and at the same time reliable measurement signal registration.

Along with the measurement electrodes, which serve to pick up a measurement signal, additional electrodes in the form of reference or grounding electrodes are often built into the measurement tube, which serve to measure an electric reference potential or to recognize a partially filled measurement tube.

The electrodes mostly comprise an elongated electrode shaft, with diversely formed indentations. The WO 2009/071615 A2 discloses an electrode with an electrode shaft with many truncated conically formed sealing lips, wherein the diameters of the lips vary in their magnitudes. Equally important are electrodes that have saw tooth formed indentations, wherein the diameter of the electrode at the tips of the teeth of the saw tooth formed indentations varies in its magnitude.

In DE 10 2008 038 161 and DE 10 2008 038 162, electrodes along with other components of an electromagnetic flow meter are fabricated in a common plastic molding process and separate from the fabrication of the measurement tube and process connections, respectively.

WO 10015534 A1 shows an electromagnetic flow meter with a sensor, wherein the sensor comprises a measurement tube, through which a medium can flow, comprises a magnetic system for producing a magnetic field, comprises at least one electrode, which is inserted into the measurement tube, for registering an electrical voltage, wherein a fixing means is provided, which serves to fix the electrode onto the measurement tube, wherein the fixing means is composed at least partially out of a plastic, and wherein the fixing means is joined to the measurement tube by plastic welding, as well as a process for the fabrication of an electromagnetic flow meter, wherein the electromagnetic flow meter comprises a measurement tube, wherein the measurement tube comprises a boring, wherein an electrode is inserted into the boring, wherein the electrode is fixed to the measurement tube by means of plastic welding. Thereby, in an embodiment, the electrodes comprise at least one sealing element, which seals the measurement tube in the region of the boring, wherein the sealing element can be partially inserted into a recess of the electrode shaft. However, there is a danger of damaging the sealing element during the mounting of the electrode in a boring in the measurement tube.

SUMMARY OF THE INVENTION

The object of the invention consists of making an electromagnetic flow meter available with an electrode arrangement that is fabricated in a cost efficient way and highly functional as a sealant.

The object is achieved by an electromagnetic flow meter fabricated for measuring the volumetric flow or mass flow of a medium in a pipe with a measurement tube, through which the medium flows in the direction of the longitudinal axis of the measurement tube, and fabricated with a magnetic system, which is embodied so that it produces a magnetic field for implementation in the measurement tube that runs essentially orthogonal to the longitudinal axis of the measurement tube, and fabricated with at least one measurement electrode that couples with the medium and that is in an area essentially orthogonal to the magnetic field, positioned in a bore in the wall of the measurement tube, and fabricated according to an inventive process, which comprises the following process steps: fabricating an elongated electrode with at least one first indentation that runs circumferentially and is orthogonal to the longitudinal expansion of the electrode, from an electrically conducting material; positioning the electrode in a tool; encapsulating of the electrode with a plastic, at least in sections.

In particular, an injection molding process is suitable, wherein in the plastic is liquefied and the electrode is molded with it. The elongated electrode comprises at least one elongation along the longitudinal axis, which is bigger than a lateral extension orthogonal to the longitudinal axis. In particular, the ratio of the elongation to the lateral extension is greater than 2 to 1. The electrode can firstly be completely encapsulated in plastic before the surplus plastic is removed.

Preferably, the electrode is encapsulated with plastic, wherein at least the electrode head is not covered by plastic. Furthermore, on the shaft end of the electrode, opposite the electrode head, plastic is likewise not provided so that electrical contact with the electrode can be made. The elongated electrode is an embodiment of the invention in operationally ready electromagnetic flow meters positioned with their longitudinal axis orthogonal to the measurement tube axis in the measurement tube wall.

The electrode is fabricated out of stainless steel, by way of example, with a circumferentially running indentation, or perhaps out of an electrically conducting plastic. If the electrode comprises a circularly formed cross section, at a right angle to the longitudinal axis, then the indentation runs circumferentially. If, at a right angle to the longitudinal axis the cross section of the indentation is rectangular formed, then it is designated as a ring groove. In other embodiments of the electrodes, the cross sections can be elliptical, oval or polygonal. The indentations can similarly comprise different sorts of cross sectional forms, e.g. rectangular or half circle formed or saw tooth formed.

If an elastic sealing ring is positioned on the electrode, then it is applied to the surface of the electrode in a sealing way, e.g. stretched over the curved surface of a cylindrically formed electrode, wherein the sealing ring, a so called O-ring in this example, comprises a free inner diameter that is smaller than the diameter of the curved surface of the electrode at the sealing rings' position on the electrode. In particular, the sealing ring is positioned on the electrode before the electrode is positioned in the tool and certainly before the electrode is encapsulated with liquefied plastic. In one embodiment, the sealing ring is positioned in an indentation on the electrode, which has been provided for seating the sealing ring, and is correspondingly embodied. The form and size of the sealing ring and first indentation are matched to each other; complementary to each other, by way of example.

While the electrode is being encapsulated with plastic, the elastic sealing ring is at least partially covered with plastic. In this, the temperature of the plastic is held under 350° C. and in particular under 200° C. The processing and material of the plastic and the material of the sealing ring are likewise harmonized with each other. The sealing ring consists, by way of example, of EPDM, Viton or Kalrez.

It is obvious that the sealing ring is a water tight sealant with respect to a plastic that surrounds the electrode as well as with respect to the electrode itself. Additional indentations can be provided in the electrode surface for determining and setting axes of the electrode and for extending any possible leakage pathway. These additional indentations likewise comprise rectangular, half circular or saw tooth formed cross sections. At least one of these additional cross sections, if present, is at least partially filled with plastic during fabrication.

If an electrode, which is positioned in an electromagnetic flow meter, which is ready operation, so that its longitudinal axis is orthogonal to the measurement tube axis, comprises a multitude of indentations that run around the circumference of the electrode, orthogonal to the longitudinal axis of the electrode, and are saw tooth formed, and according to an embodiment, the alignment of the saw teeth is such that each back side of a tooth, from its base to its tip points in the direction of the lumen of the measurement tube through which the medium flows, i.e. a directional component points in the direction of the measurement tube axis. The gaps between the teeth are thereby at least partially filled with plastic, in sections.

The so-called Christmas tree shape, as disclosed in WO 2009/071615 A2, is also comprised here, whereby the saw teeth here have varying lengths, of a back side of a tooth, or varying wedge angles, so that the distances between the tips of the saw teeth and the longitudinal axis of the electrode are different.

An indentation is designated as such on grounds of the fabrication technique. An indentation constitutes a cut-in, in a lathed part for example. Naturally, in terms of geometry, a single indentation engenders two formations next to the indentation. So, in an example, the inventive electrode comprises a flange in form of a lip. Another example shows the inventive electrode with a circumferentially running formation for anchoring and for extending any possible leakage pathway. In both examples, the formations can be retained by conducting cut-ins next to the formations, which permit the formations to first appear as such.

The electrode is aligned in the tool by means of a first and second contour, by way of example. For this, the electrode comprises, for example, a conical electrode head and/or a boring on the opposite end of the shaft. The tool or a core forming the lumen of the measurement tube comprises the complimentary contours that are compatible with the contours of the electrode, i.e. contours that fit together with the contours of the electrode. So the electrode is, for example, placed on and positively locked with the core that is for the flow conducting lumen of the measurement tube in later operation of the electromagnetic flow meter, where the conical electrode head is joined to the complimentary conical indentation of the core. Alternatively, the electrode can also comprise a groove instead of a boring in the end of the electrode shaft opposite the electrode head, or also be aligned in the tool, and held in place during the molding process, by means of magnetism.

In an embodiment, the electrode is encapsulated with plastic, which forms the measurement tube at the same time. In another embodiment, in a first process step the measurement tube is molded with a space provided for the positioning of the electrode and subsequently the electrode is inserted in this space and encapsulated with plastic, wherein, the previously fabricated measurement tube serves here as a tool, and the encapsulation of the electrode with plastic, which is fabricated in the second process step, is likewise a part of the measurement tube. Further embodiments show the electrode encapsulated by plastic, wherein the electrode and encapsulation are placed together in a boring of the measurement tube wall and are, by way of example, subsequently welded to it by means of ultrasonic welding in particular.

If at least a part of the measurement tube, in particular a half pipe, is molded with the liquefied plastic, and if there is a core which forms a lumen of the measurement tube and comprises a fourth contour that is complimentary to a second contour of the electrode, wherein the electrode and the core are positioned with respect to each other so that the second and fourth complimentary contours are aligned in a positive lock, then, these parts of the measurement tube, e.g. two identical half pipes, along with other parts are subsequently joined, in particular by substance-to-substance welding.

BRIEF DESCRIPTION OF THE DRAWINGS

The invention permits a multitude of embodiments. Some of them are to be more closely described with the help of the following figures. Identical elements are provided with the same reference characters in the figures.

DETAILED DISCUSSION IN CONJUNCTION WITH THE DRAWINGS

The present invention relates to a process for fabricating an electromagnetic flow meter, in particular of the process measurement technology, for determining the flow of a measurement medium through a measurement tube.

Figure 1:
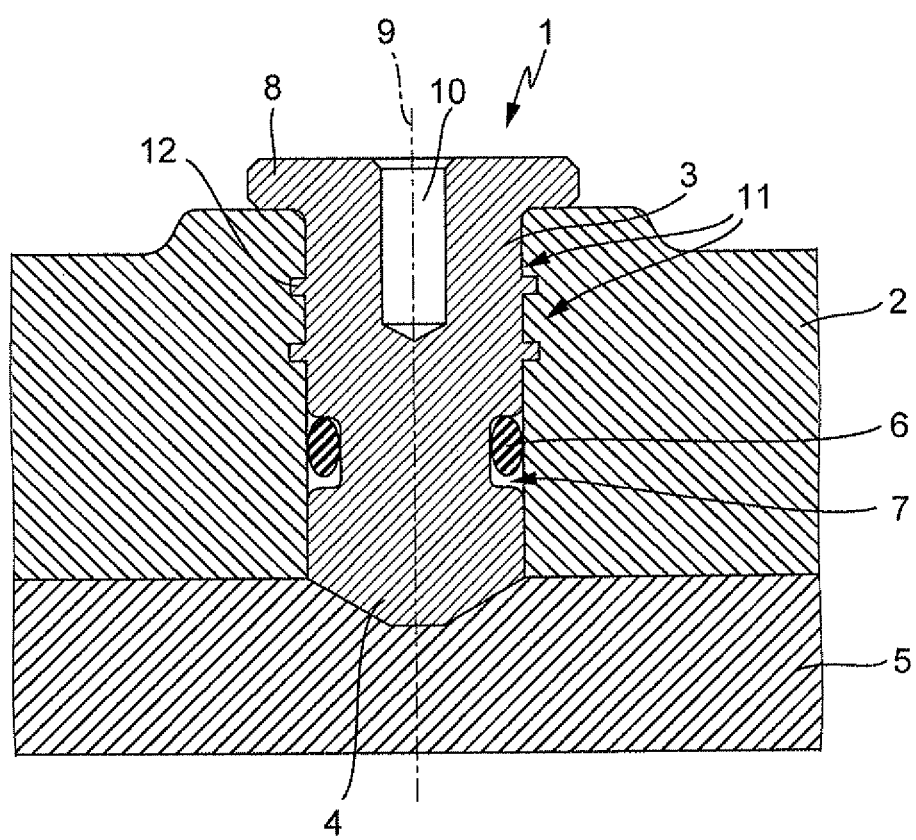
FIG. 1 shows the cross section of a measurement tube and an electrode of an inventive electromagnetic flow meter in a first embodiment.

In FIG. 1, a cross section of an electrode arrangement of an electromagnetic flow meter is depicted. The electrode 1 is inserted in the wall 2 of a measurement tube and comprises an electrode shaft 3 and an electrode head 4, which is a least partially wetted by the medium 5 during measurement operation.

Mediums 5 can be pure substances as well as mixtures. The electrode head 4 comprises a conical form in the region in which it extends out into the lumen of the measurement tube. In the region of the measurement tube wall 2 the electrode shaft 3 comprises a basic cylindrical form. A cross section of the electrode 1 in a plane parallel to the O-ring 6 is approximately circular within the framework of the common norms for structural and fabrication requirement tolerances of a person skilled in the art. Other forms are also possible. Oval or elliptical cross sections assure a better stress distribution during thermal expansion of the measurement tube.

Furthermore, in the region of the electrode shaft 3, a first circumferential indentation 7 is provided, wherein a sealing ring, here an O-ring 6, is positioned. The O-ring 6 extends marginally beyond the circumference of the electrode shaft 3, so that it forms a first level of sealing and seals off the electrode in the region of the measurement tube wall 2. On the end opposite to the electrode head 4, the electrode comprises a flange 8 which closes off the electrode 1. The flange 8 protrudes orthogonally from the longitudinal axis of the electrode 9. Along the longitudinal axis of the electrode 9 on the end farthest from the electrode head 4, the electrode 1 comprises a boring 10, wherein a plug, not depicted, can be inserted. The plug thereby serves to pick up the electric potential measured by means of the electrode head 4 in the medium 5. The boring 10 furthermore serves as a second contour for aligning the electrode in the tool during the fabrication process. To this effect, the conically formed electrode head 4 serves as a first contour.

In the fabrication process of this embodiment of the invention, the electrode 1 then is, by way of example, placed in an injection molding tool. For this, the electrode head 4 is positioned in a formation of a core, which is complimentary to the electrode head 4. The core later forms the lumen of the measurement tube, wherein the medium 5 flows. Further, the electrode 1 is fixed in the boring 10 in the electrode shaft 3 by means of a mandrel, before the electrode is molded with plastic. In this example, the electrode 1 is molded directly into the measurement tube wall 2, which here is fabricated monolithically. In other examples, the measurement tube wall 2 is fabricated from two or more molded pieces.

The measurement tube is surrounded by a housing, which is not shown here, at least in the region of the electrodes. The measurement tube, through which the medium 5 flows and which is under process pressure, is sealed off, in a pressure and liquid tight way, in the region of the electrode shaft 3 by means of a first sealing level consisting of a circumferentially oriented O-ring 6. The O-ring 6 comprises the required physical and chemical properties that are necessary for use in typical mediums such as, for example, drinking and waste water. Furthermore, the O-ring 6 is especially designed for an application in connection with materials consisting of plastic. Typical materials for inventive measurement tubes are, for example, PA, PP, PPE, PSU, PPS, PEEK or PVC. The electrodes are fabricated, for example, from rust resistant stainless steel, tantalum, Hastelloy platinum or titanium.

The O-ring 6 is surrounded, in this example, by plastic of the measurement tube wall 2, in sections. In the sections where the O-ring 6 is directly applied to the electrode 1, it is naturally not covered by plastic. Here, the first indentation 7 is likewise partially filled from the plastic of the measurement tube wall 2. The O-ring 6 is positioned on the electrode 1, here in the indentation 7, before the electrode 1 is positioned in the tool.

Next to the indentation 7, wherein the O-ring 6 is positioned, the electrode comprises additional indentations 11, which are filled with the plastic of the measurement tube wall 2. Through them, the formations 12 of the electrode 1 are defined, which serve for axial anchoring of the electrode 1 along the longitudinal axis 9 in the measurement tube wall 2 and which, at the same time, extend the leakage pathways. Here, the indentations 7 and 11 comprise a rectangular form in the cross section, though many forms are possible, such as, for example, undercut or half circle forms for seating a torus-shaped O-ring 6.

The first indentation 7 comprises a depth orthogonal to the longitudinal axis 9 of the electrode 1 and a width parallel to the longitudinal axis 9 of the electrode 1. The sealing ring, here O-ring 6, also comprises a cord thickness in the direction of the longitudinal axis 9 and a cord breadth orthogonal to the longitudinal axis 9 of the electrode 1. If the sealing ring is, as is visualized in this figure, a torus-shaped O-ring 6, then the cord thickness and cord breadth are equal and equivalent to the cord diameter. The ratio of the cord thickness to the indentation width is, according to an embodiment, at most $8/10$ and at least $6110$, whereas the ratio of the cord breadth to indentation depth amounts to at most $15/10$ and at least $12/10$. If the sealing ring is an O-ring 6, then the free area is defined by the inner diameter of the O-ring 6. The sealing ring can thus be tightly, i.e. in a sealing way, stretched on the electrode.

Figure 2:
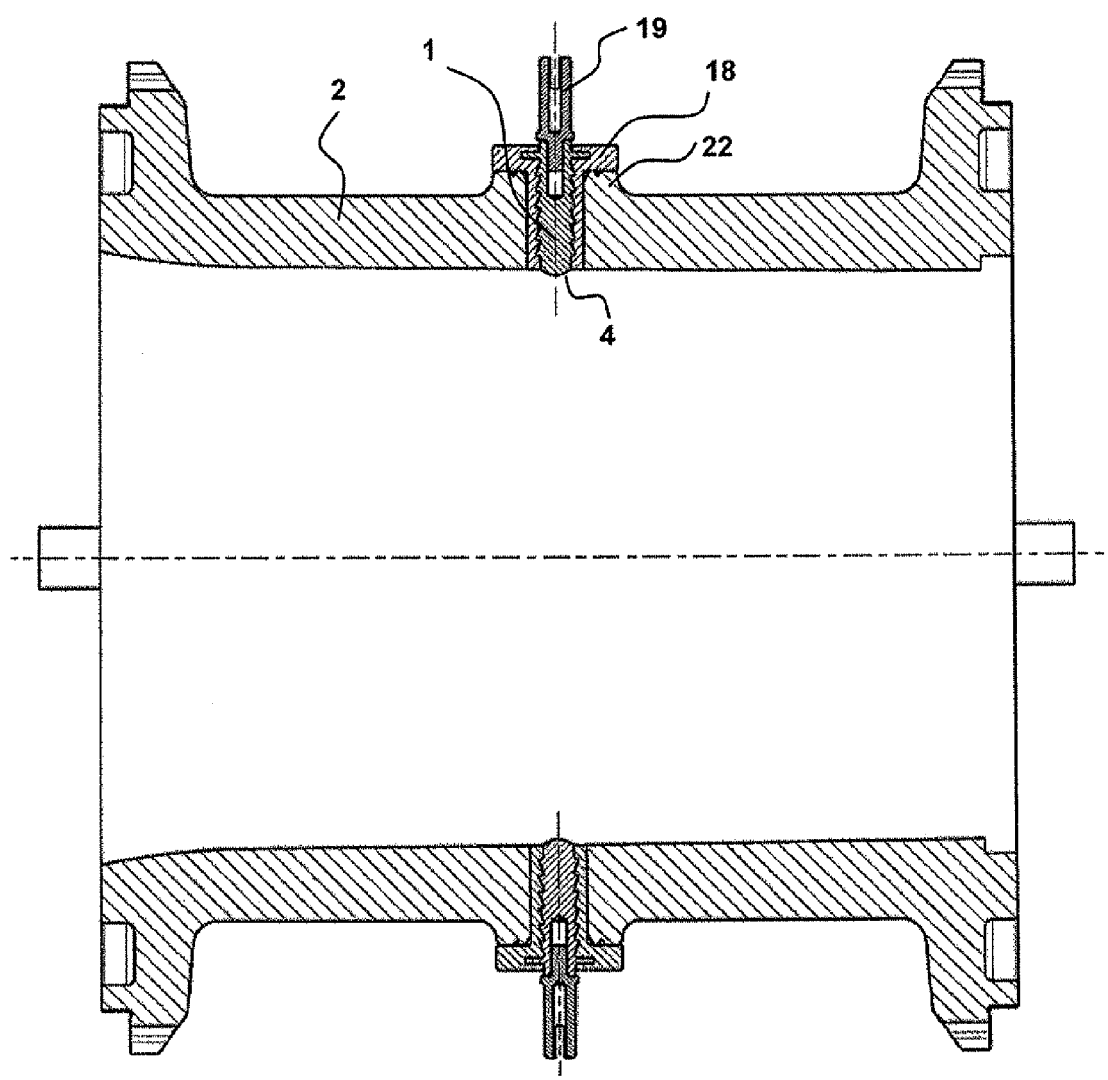
FIG. 2 shows a cross section of a measurement tube and an electrode of an inventive electromagnetic flow meter in a second embodiment.

FIG. 2 shows then a further embodiment of the invention. An electrode 1 comprises an encapsulation 18 of plastic, which is inserted in the measurement tube wall 2. This encapsulation 18 is fabricated, by way of example, from the same plastic as the measurement tube wall 2. The electrode 1 is molded in the encapsulation 18, wherein the surface area of the electrode 1 is covered by plastic, at least in sections. At least one free section of the surface area of the electrode 1 is not covered by the plastic, here the electrode head 4 and the opposite end of the electrode 1 with a boring along the longitudinal axis of the electrode 1, into which a plug 19 is inserted for electrical contact with the electrode 1. The potential picked up by the electrodes is transmitted to a measurement and/or operation circuit, which is not explicitly shown. From the electric potential, a voltage is derived, which is proportional to the flow, and from that the flow is determined.

The encapsulation 18 together with the electrode 1 can be fabricated separate from the measurement tube, or in a subsequent process step in a process.

If the measurement tube is fabricated first, with a space provided for the installation of the encapsulated electrode, then this space is held free by a core or a tool. This core is subsequently removed. After this, the electrode 1 together with encapsulation 18 can be inserted, or only the electrode 1 is inserted and the free space is filled with liquefied plastic. This has the advantage that the encapsulation does not need to additionally be plastic welded onto the measurement tube.

Naturally, in addition to the described injection molding process, other primary molding processes are comprised. An inventive electrode may also be fabricated in an immersion bath, wherein liquefied plastic hardens onto the electrode and is subsequently machined to the desired form. However, along with coating processes, other such processes are more laborious than the described injection molding.

The encapsulation 18 forms a part of the measurement tube wall 2. According to the invention, at least the part of the measurement tube wall 2, which surrounds and contacts the electrode 1, is fabricated from plastic. There are other alternatives, as well, to an encapsulation 18 of an electrode 1, which can be inserted into a finished measurement tube and to an electrode 1, around which the complete measurement tube is molded. So on the one hand, a measurement tube wall 2 can comprise an free space, in which the electrode 1 is inserted, and which is subsequently filled with plastic, and on the other hand only a part of the measurement tube, e.g. a half pipe, can be molded around the electrode 1, wherein the half pipes are subsequently combined into a measurement tube, e.g. be plastic welded together. In terms of fabrication, clear advantages of the half pipes are obvious to someone skilled in the is art. Along with the actual flow conducting part of the measurement tube, the measurement tube comprises additional parts, such as flanges for example. These can, but do not have to, be fabricated in a single process. In particular, flanges are simple to add to a measurement tube.

Figure 3:
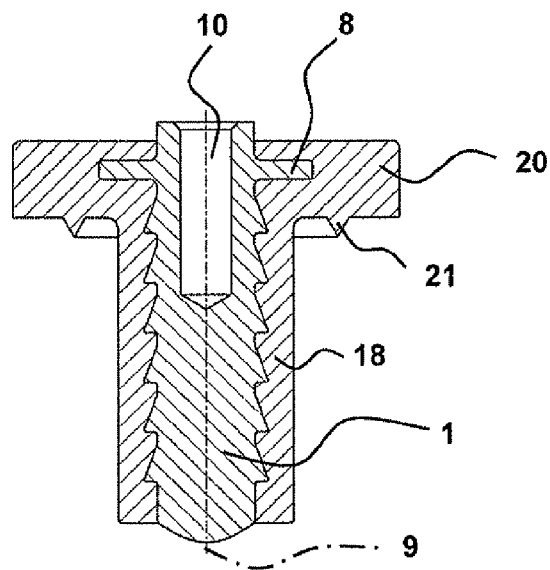
FIG. 3 shows a cross section of an electrode of an inventive electromagnetic flow meter with an encapsulation of plastic.

In FIG. 3 an electrode 1 is drawn in section together with its encapsulation 18, which is fabricated separate from the measurement tube. The electrode 1 comprises a boring 10 for receiving a plug and a multitude of saw tooth formed indentations. An elastic sealing ring is not provided. Impermeability of the connection between encapsulation 18 and electrode 1 is achieved by means of a multitude of indentations. A flange 8 protrudes orthogonally from the longitudinal axis 9 of the electrode in the region of the end of the electrode shaft, opposite the electrode head, for fixing the electrode 1 in the tool and/or the connection with the plastic of the encapsulation 18.

The plastic of the encapsulation 18 comprises the same sort of properties as the plastic of the measurement tube wall, or is just the same. The encapsulation 18 is embodied in a plate shape in the region of the lid formed flange 8 of the electrode 1. This encapsulation plate 20, is mounted on a mounting surface, which is situated on the outside of the measurement tube. The mounting surface is formed with a fixing means 22.

The cylindrical boring inserted in the measurement tube wall is surrounded by the fixing means 22 in the form of a lid formed attachment. The fixing means 22 is arranged on the outside of the measurement tube. In this, the measurement tube consists of plastic, at least in the region of the boring and the fixing means 22. The encapsulation 18 together with the embedded electrode sits with its plate 20 on the flat mounting surface closing off the fixing means. The mounting surface of the plate 20 runs orthogonal to the longitudinal axis of the measurement electrode and parallel to the longitudinal axis of the measurement tube. The plate 20 is connected to the fixing means 22 by means of a plastic welding process.

The plate additionally comprises a welding lip 21 along the joining area on the fixing means 22. The weld lip 21 has a roof-formed cross section and is substance to substance melded with the fixing means 22. The boring is thus sealed in a fluid and pressure tight way.

Figure 4:
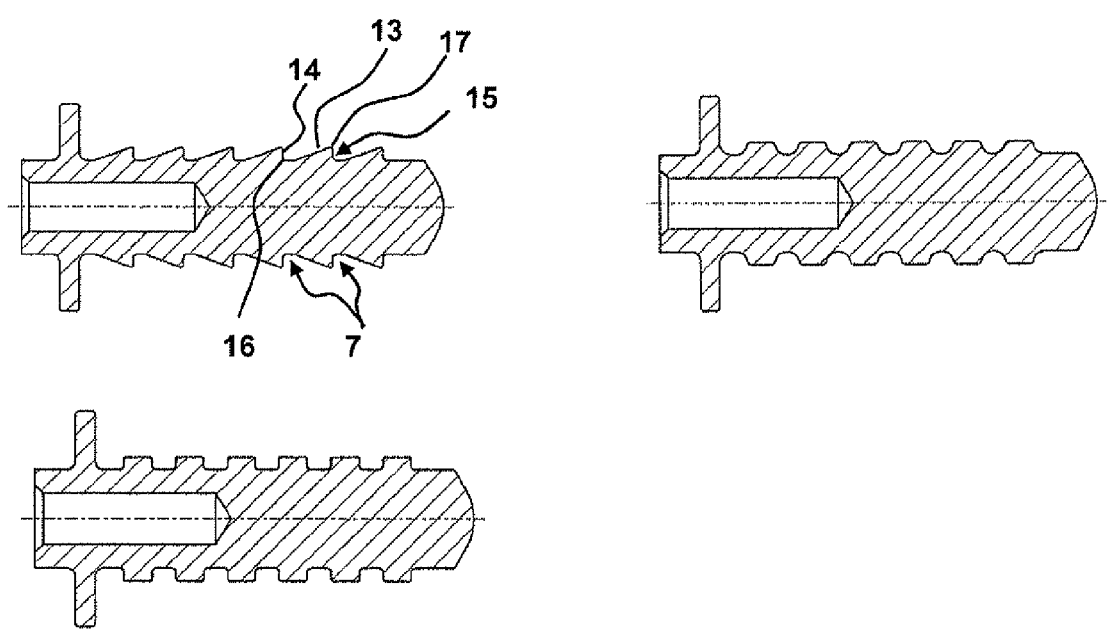
FIG. 4 shows a multitude of cross sections of different electrode forms.

For the references to a saw tooth formed indentation, see the following description for FIG. 4.

In FIG. 4, various sorts or electrodes are sketched. The electrodes hereby comprise the same basic form, but differentiate themselves through their indentations 11. In addition to the already mentioned saw tooth form, half-circle formed indentations 11 and rectangular formed indentations 11 are to be seen. However, other forms for anchoring the electrode and for extending leakage pathways are also possible, e.g. also with undercut.

On a short note to the references on a saw toothed formed indentation 7. The indentation 7 is demarcated by the back side of a tooth 13 and the forward facing side of a tooth 14. The free space in between is designated as a gap in the teeth 15. The intersection of the back side of a tooth 13 and the forward facing side of a tooth 14 from one single indentation 7 is called the base of the tooth 16. The intersection between a back side of a tooth 13 and the forward facing side of a tooth 14 from two neighboring indentations 7 is called tip of a tooth 17. The angle between the back side of a tooth 13 and the forward facing side of a tooth 14 is called a wedge angle.

The invention claimed is:

1. A process for fabricating an electromagnetic flow meter, comprising the steps of:
   encapsulating an electrode with a liquefied plastic, wherein the electrode is fabricated out of an electrically conducting material and with at least a first circumferential indentation that runs orthogonal to the longitudinal expansion of the electrode; and
   positioning the electrode in a tool and encapsulated with said liquefied plastic, at least in sections,
   wherein the first indentation is encapsulated, at least in sections, with said liquefied plastic, an elastic sealing ring is positioned on the electrode, the elastic sealing ring is positioned in the first indentation of the electrode for seating the sealing ring, the elastic sealing ring is encapsulated with a plastic, at least in sections, and
   the sealing ring is fabricated out of a polymer and the temperature of the plastic is held below 350° C. as the sealing ring is being at least partially encapsulated, at least in sections.

2. The process for fabricating an electromagnetic flow meter according to claim 1, wherein the electrode is fabricated with one of: a circular or elliptical or oval cross-section.

3. The process for fabricating an electromagnetic flow meter according to claim 1, wherein the electrode is fabricated with additional indentations, which are filled with liquefied plastic, at least in sections.

4. The process for fabricating an electromagnetic flow meter according to claim 1, wherein the tool comprises a third contour that is complimentary to a first contour of the electrode and in that the positioning of the electrode in the tool occurs by positively locking the complementary first and third contours with each other.

5. The process for fabricating an electromagnetic flow meter according to claim 1, wherein a measurement tube is molded with liquefied plastic and a core that forms a lumen of the measurement tube, and in that the core comprises a fourth contour, which is complimentary to a second contour of the electrode; and the electrode is positioned on the core by positively locking the second and fourth complimentary contours to each other.

6. The process for fabricating an electromagnetic flow meter according to claim 1, wherein an encapsulation is molded with the liquefied plastic around the electrode, which is subsequently mounted in a measurement tube.

7. The process for fabricating an electromagnetic flow meter according to claim 6, wherein the encapsulation along with the electrode is positioned in a free space provided for it in a wall of a measurement tube, and is subsequently substance to substance bonded to the measurement tube by means of a plastic welding technique.

8. The process for fabricating an electromagnetic flow meter according to claim 1, wherein in a first process step, a measurement tube wall of the measurement tube is molded from a liquefied plastic and in that in a second process step, an encapsulation is molded with liquefied plastic around the electrode in a free space provided for it in the wall of the measurement tube.

9. A process for fabricating an electromagnetic flow meter for measuring the volumetric flow or mass flow of a medium in a measurement tube, comprising steps of:

encapsulating an electrode with a liquefied plastic, wherein the electrode is fabricated out of an electrically conducting material and with at least a first circumferential indentation that runs orthogonal to the longitudinal expansion of the electrode; and positioning the electrode in a tool and encapsulated with said liquefied plastic, at least in sections, wherein the first indentation is encapsulated, at least in said sections, with said liquefied plastic, wherein in a first process step, a measurement tube wall of the measurement tube is molded from said liquefied plastic and in a second process step, an encapsulation is molded with said liquefied plastic around the electrode in a free space provided for it in the wall of the measurement tube; and wherein the same plastic is used in both process steps.

10. The process for fabricating an electromagnetic flow meter according to claim 1, wherein at least the first indentation is fabricated with a rectangular or a circular or a saw tooth formed cross section.

11. The process for fabricating an electromagnetic flow meter according to claim 3, wherein at least one second indentation of the electrode is fabricated with a tooth formed cross section; and the electrode is positioned in the measurement tube such that a back side of a tooth, from the base of a tooth to the tip of a tooth formed cross section, points in the direction of a flow conducting lumen of the measurement tube.

12. The process for fabricating an electromagnetic flow meter according to claim 9, wherein at least the first indentation is fabricated with a rectangular or a circular or a saw tooth formed cross section.

* * * * *